Figure 4:
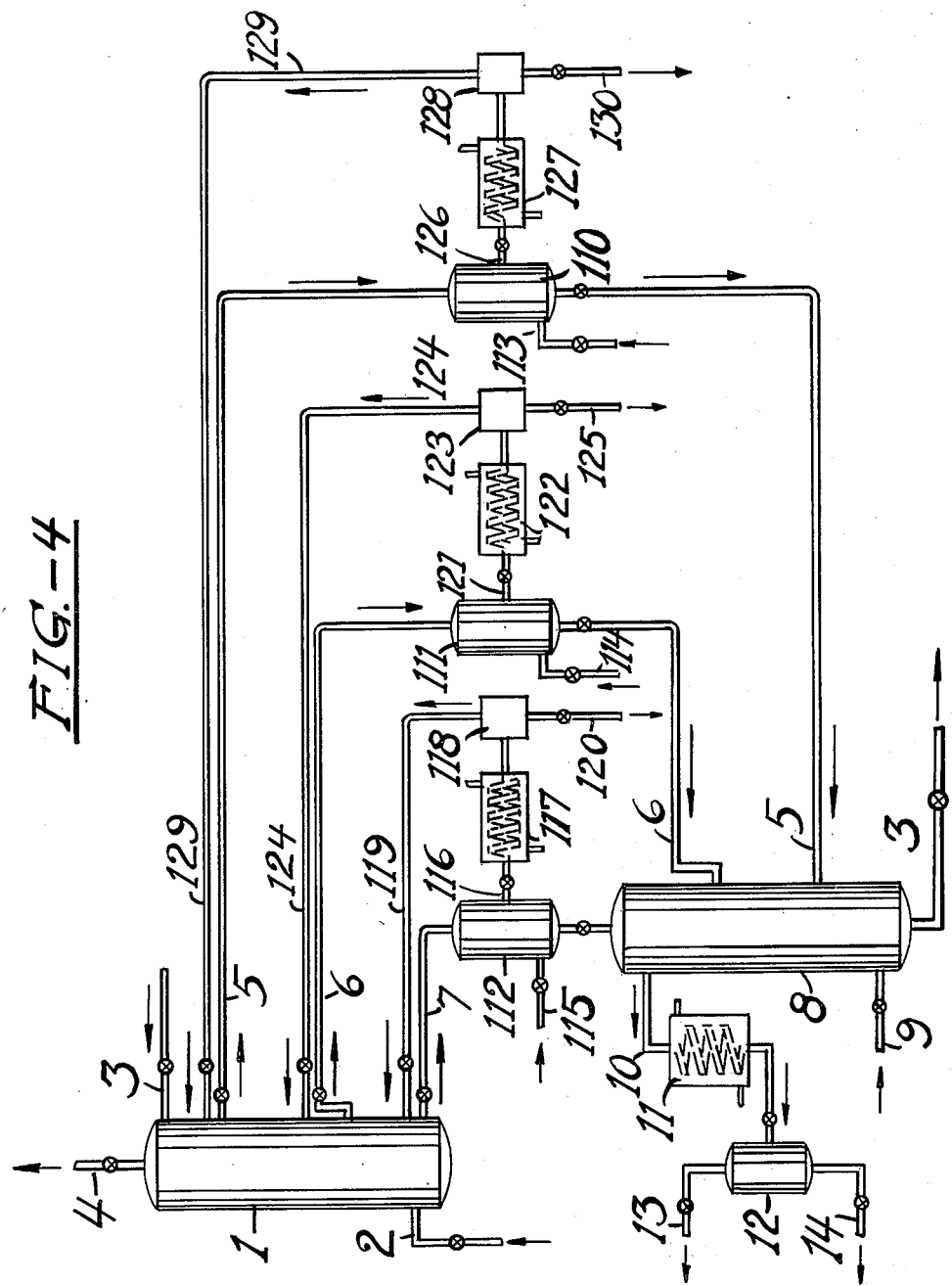

Nov. 23, 1943.　　F. A. L. HOLLOWAY　　2,335,009
REFINING PROCESS
Filed Dec. 21, 1940　　3 Sheets-Sheet 1
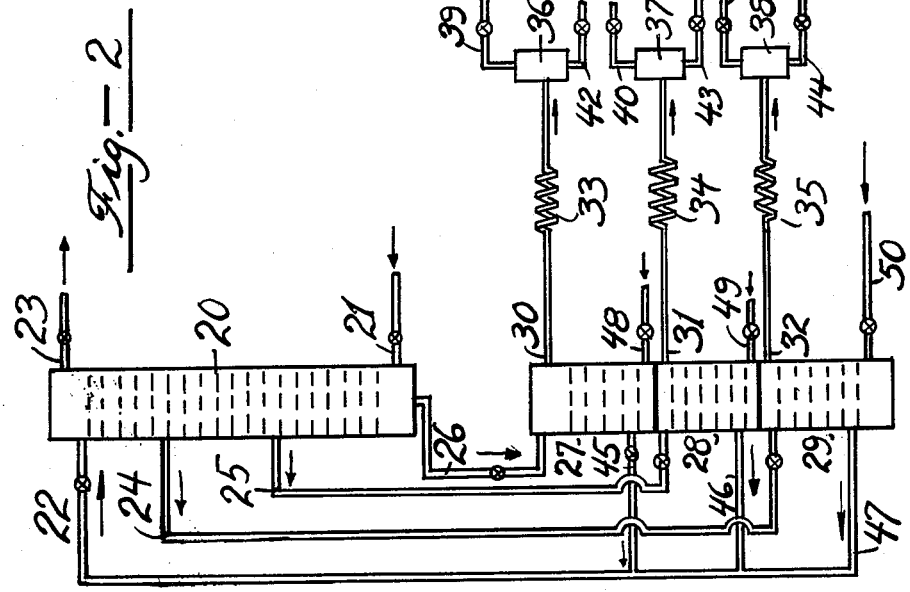
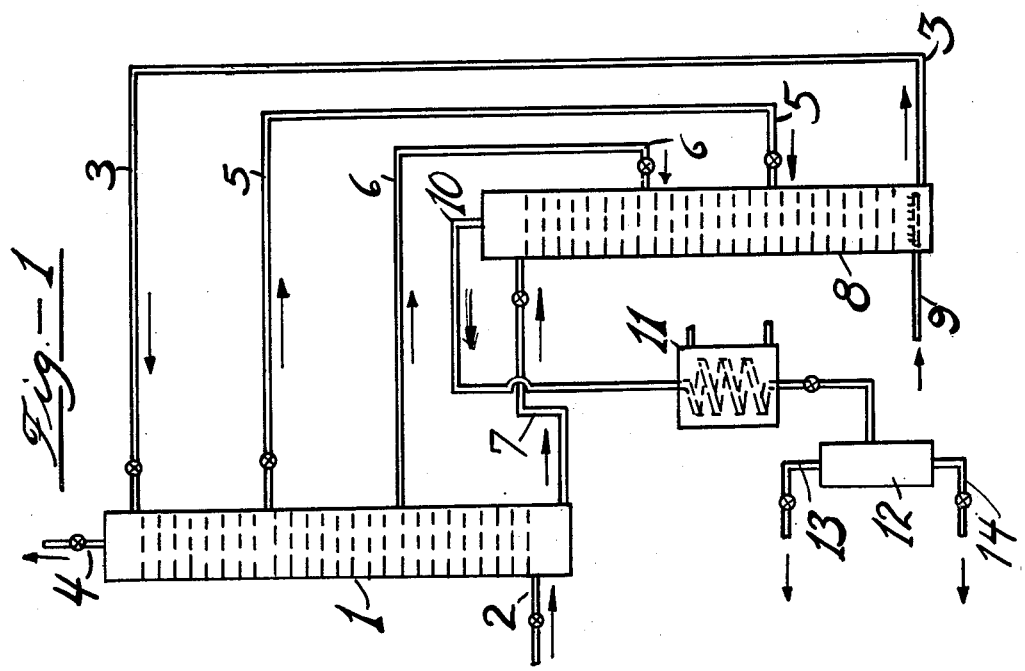
Frederic A. L. Holloway Inventor
By ⟨signature⟩ Attorney

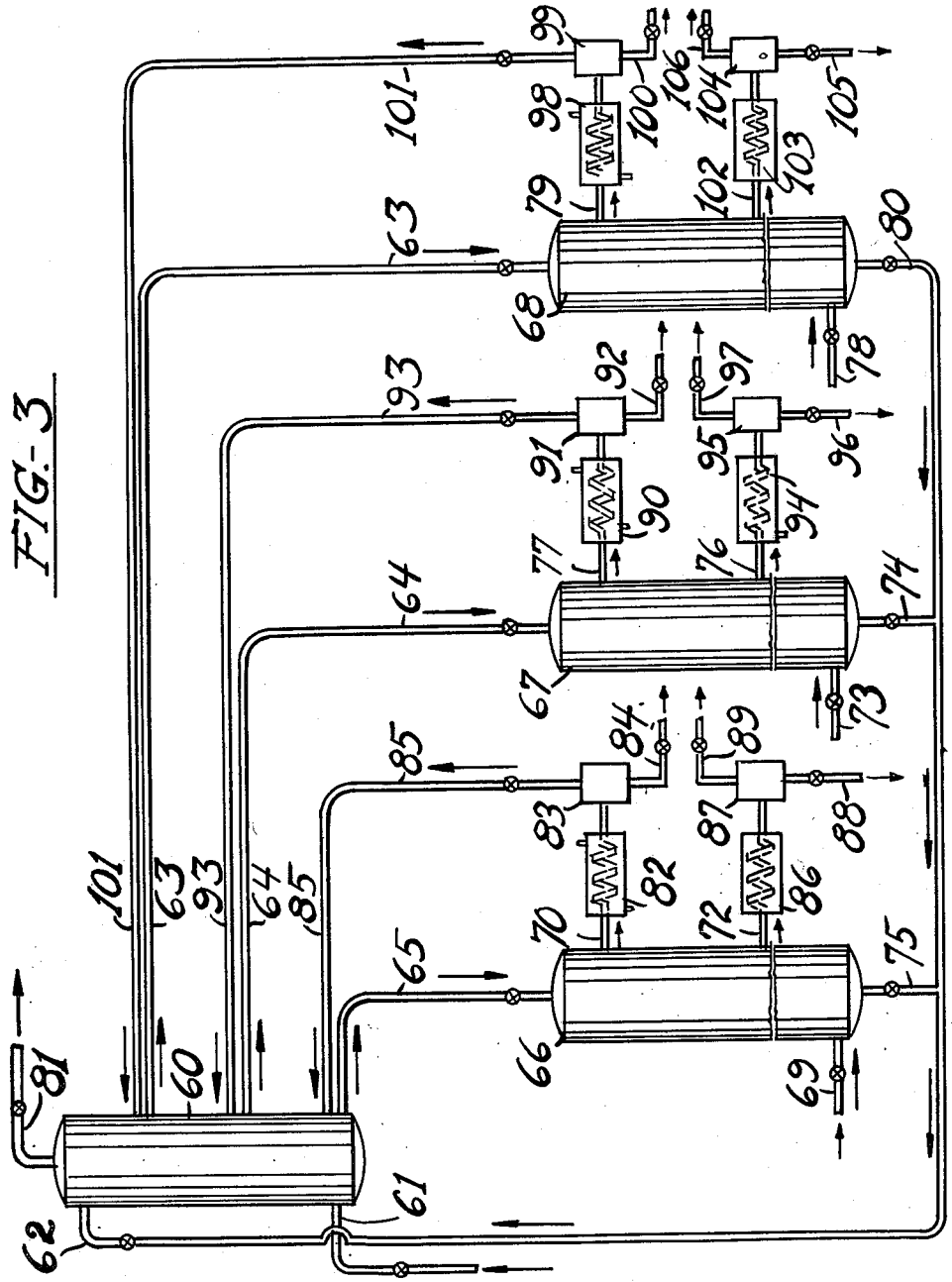

Nov. 23, 1943.    F. A. L. HOLLOWAY    2,335,009
REFINING PROCESS
Filed Dec. 21, 1940    3 Sheets-Sheet 3

Frederic A. L. Holloway Inventor
By ......... Attorney

Patented Nov. 23, 1943

2,335,009

UNITED STATES PATENT OFFICE 2,335,009

REFINING PROCESS

Frederic A. L. Holloway, Baton Rouge, La., assignor to Standard Oil Development Company, a corporation of Delaware Application December 21, 1940, Serial No. 371,115

17 Claims. (Cl. 196—8)

The present invention relates to the refining of mineral oils and is especially concerned with separation processes in which several components of a fluid stream are segregated from the fluid stream by countercurrent contact with an absorbent solution. The invention is more particularly concerned with an improved process for the recovery of valuable hydrocarbon constituents from vaporous mixtures comprising low boiling gaseous hydrocarbons and fixed gases. In accordance with the present process, a fluid stream comprising a plurality of desirable constituents is countercurrently contacted with an absorption solution, the quantity of which is optimally adjusted with respect to the changing concentrations of the respective desirable constituents in the flowing fluid stream throughout the countercurrent contacting path, so as to particularly and efficiently remove and recover the respective desirable constituents with a minimum absorption of undesirable constituents.

In the production and processing of mineral oils, particularly in the refining of petroleum oils, relatively large quantities of gases are produced, the constituents of which differ appreciably in chemical structure and which are present in widely varying concentrations. These gases contain various concentrations of hydrocarbon constituents boiling in the methane, ethane, propane, butane and higher boiling hydrocarbon boiling range. The butanes, butylenes, pentanes, pentenes, and higher boiling hydrocarbons, due to their physical and chemical qualities, may be readily included in whole or in part in motor fuels or used in other processes. There is also an increasing demand for propane, propylene and ethylene. It is, therefore, conventional refinery practice to recover these hydrocarbon constituents particularly those constituents containing from four to six and a higher number of carbon atoms in the molecule from feed gases containing the same, by various procedures. For example, it is known to contact feed gases containing valuable recoverable hydrocarbons with a solid adsorbent, such as activated carbon, under conditions in which the desirable hydrocarbons are adsorbed on the carbon to the partial exclusion of fixed gases and lower boiling undesirable hydrocarbon constituents. The adsorbed hydrocarbons are then recovered from the carbon by various distilling operations. Another known method is to compress and cool the hydrocarbon gases and thus condense the relatively higher boiling desirable hydrocarbon constituents.

It is also known to recover desirable hydrocarbon constituents from feed gases containing the same by contacting the gases with an absorption oil under suitable temperature and pressure conditions. In the usual oil absorption recovery operation, lean absorption oil is passed downwardly in a countercurrent bubble cap tower or similar equipment in which it intimately contacts a stream of upflowing gases containing the desirable recoverable hydrocarbon constituents under conditions to selectively remove the maximum quantity of desirable hydrocarbons with a minimum removal of undesirable constituents. The fixed gases and normally gaseous hydrocarbon constituents substantially free of hydrocarbon constituents whose recovery is desired are removed from the top of the absorber while the absorption oil containing the absorbed relatively high boiling hydrocarbon constituents is removed from the bottom of the absorber. The absorption oil is then distilled under conditions to fully remove and recover the absorbed hydrocarbons. The absorption oil free of absorbed hydrocarbons is removed from the still and recirculated to the absorption zone.

In operations of this character in order to achieve a satisfactory removal of an individual constituent from a fluid stream by countercurrent absorption action, it is necessary that the flow ratio of absorbing fluid relative to the treated fluid be at least equal to and preferably moderately greater than a certain minimum quantity, which is a function of the solubility or equilibrium distribution relations of the individual constituent between the treated fluid and the absorbing fluid under definite conditions of temperature and pressure. Desirable components that are less soluble in the absorbent fluid require correspondingly greater relative amounts of the absorbent for nearly complete removal. Similarly, a certain minimum ratio of stripping fluid to absorbent fluid is necessary in order to remove an individual absorbed component from the absorption fluid. It is known that the more soluble the individual absorbed constituent is in the absorption fluid the greater will be the minimum amount of stripping fluid which will be required to satisfactorily remove the absorbed constituent from the absorption fluid.

In conventional processes for removing and recovering valuable hydrocarbon constituents from gaseous mixtures containing the same, the entire quantity of the absorption oil is contacted countercurrently with the entire quantity of feed gases. The quantity of the absorption oil utilized relative to the quantity of feed gases is determined by the solubility relations of the least soluble constituent which is desired to be absorbed in the absorption oil. Thus in an efficiently designed absorption tower operated in a manner for example to recover butanes and higher boiling hydrocarbon constituents from gaseous mixtures containing the same, the quantity of absorption oil used is regulated with respect to operating temperatures and pressures so that the partial pressure of the butane in the absorption oil at the point of withdrawal of the absorption oil will be only slightly less than the partial pressure of the butane in the entering feed gas, and that the quantity of butane leaving in the treated residue gases is quite small in proportion to that in the entering feed gases. This quantity of absorption oil is appreciably in excess of that required for substantially complete absorption of pentane and higher boiling hydrocarbons and thereby results in appreciably lower partial pressures of pentanes and heavier desirable constituents in the absorption oil at the point of withdrawal of the absorption oil than the partial pressures of pentane and heavier desirable constituents in the entering feed gas.

The absorption oil is then usually sent to a stripping zone, wherein it is treated countercurrently with a stripping fluid, the quantity of which is regulated with respect to operating temperatures and pressures so as to remove in a substantially complete manner the absorbed component most soluble in the absorption oil. Thus, in an efficiently designed stripping tower operated in a manner to remove hexane and lower boiling hydrocarbon constituents from an absorption oil, the quantity of stripping fluid used is regulated so that the partial pressure of the hexane in the stripping fluid at the point of withdrawal of the stripping fluid will be only slightly less than the partial pressure of the hexane in the entering absorption oil, and that the quantity of hexane leaving in the stripped or lean absorption oil is quite small in proportion to that in the "fat" oil entering the stripping zone. This quantity of stripping fluid is appreciably in excess of that required for substantially complete stripping of pentanes and lower boiling hydrocarbons, which results in appreciably lower partial pressures of pentanes and lighter constituents in the stripping fluid at the point of withdrawal of the stripping fluid than the partial pressures of pentanes and lighter constituents in the entering fat absorption oil.

In the operation described above, where all desired constituents of the feed gases are absorbed in a single stream of absorption oil, which is of quantity sufficient for nearly complete recovery of the least soluble constituent, but considerably in excess of that required for the more soluble constituents, the latter are recovered in more dilute solution than is possible and desirable. In a subsequent stripping operation considerably greater quantities of stripping fluid than the minimum requirement are necessary to strip the more soluble constituents from the excess quantity of absorption oil in which they are contained.

I have now discovered a process by which desirable valuable vaporous constituents may be economically and efficiently recovered from feed gases containing the same in which the amounts of absorption fluid and especially of stripping fluid required are substantially reduced. My process comprises removing the desirable constituents from the feed gases successively in stages. A relatively small amount of absorption fluid is employed to remove initially the most soluble desirable constituents. Larger amounts of absorption fluid are then successively employed to remove the relatively less soluble constituents in the order of decreasing solubility. The desired constituents are thus absorbed in segregated quantities of absorption fluid, in the maximum concentrations permissible by virtue of their solubility or equilibrium distribution relations. In subsequent stripping operations, the more highly soluble components, the removal and recovery of which require large quantities of stripping fluid relative to the absorption fluid, may nevertheless be recovered with economical quantities of stripping fluid by virtue of their segregation and concentration in a small quantity of absorption fluid. The less soluble absorbed constituents are inherently easy to remove and recover even though contained in larger quantities of absorption fluid. In general, each individual constituent or group of constituents of like degree of solubility, whose recovery from the original feed mixture is desired, is absorbed in the minimum quantity of absorption fluid, in a manner such that the minimum quantity of stripping fluid is necessary for final recovery. The process of my invention will be readily understood by reference to the attached drawings illustrating modifications of the same.

For purposes of description the process is described with respect to its adaptation for the recovery of hydrocarbon constituents boiling in the butane, pentane and hexane boiling range from feed gas mixtures containing the same, as well as the undesirable carrier gases methane, ethane, and propane, even though it is widely applicable to many other cases of industrial gas absorption and also to liquid-liquid extraction processes. Figure 1 illustrates an operation when employing an absorption zone and a stripping zone, while Figures 2, 3, and 4 illustrate certain particular modifications and adaptations of the process. Referring specifically to Figure 1, it is assumed that the feed gases comprising hydrocarbon constituents containing from one to six carbon atoms in the molecule are produced by conventional refining operations. The feed gases are introduced into absorption tower 1 by means of feed line 2. The gases flow upwardly through absorption tower 1 and countercurrently contact downflowing absorption oil which is introduced into tower 1 by means of line 3. Operating conditions are adjusted so as to remove overhead a treated gas substantially free of hydrocarbon constituents containing from four to six carbon atoms in the molecule and to remove segregated portions of the absorption oil at spaced intervals along the countercurrent contacting path. The feed gases introduced into absorption tower 1 by means of feed line 2 initially contact only a portion of the downflowing absorption oil in the lower section of the absorption tower. The quantity of downflowing absorption oil in the lower section is maintained just sufficient to remove the most soluble hydrocarbon constituents, in the present instance the hexanes, nearly completely from the feed gases. A fraction, but by no means the whole of the next most soluble constituents, the pentanes, are also removed from the feed gases by this quantity of absorption oil, and likewise very small fractions of butanes, the least soluble constituent whose recovery is desired, and of the undesirable constituents propane, ethane, and methane are removed. This portion of absorption oil containing, dissolved therein, substantially all of the hexanes and small fractions of the total quantities of pentanes, butanes, etc., introduced in the feed gases, is removed from the absorption zone by means of line 7 and handled to remove and recover the dissolved hydrocarbon constituents preferably as hereinafter described. The feed gas substantially free of the hexanes, but only partially or very slightly depleted of their content of pentanes, butanes, etc., flow upwardly from the lower section into an intermediate section of the absorption zone wherein it contacts both the quantity of absorption oil downflowing through the lower section and an additional volume of downflowing oil, the sum of which comprises a larger total volume of absorption oil than that contacted in the lower section.

In the intermediate section of the absorption zone under these conditions in which a smaller volume of feed gas contacts a larger volume of absorption oil, the constituents having an intermediate solubility in the absorption oil, in the present instances the pentanes, are dissolved and nearly completely removed in the absorption oil. A portion of the absorption oil from the intermediate section containing dissolved therein primarily the hydrocarbon constituents of intermediate solubility, is removed from the system by means of line 6, while the remainder of the absorption oil passes downwardly and absorbs hydrocarbon constituents of the greatest solubility, as previously described.

The feed gases substantially free of the hexane hydrocarbon constituents, and also free of the pentane hydrocarbon constituents, flow upwardly from the intermediate section of the absorption zone into an upper section of the absorption zone, in which the gases contact a greater volume of absorption oil than said gas has contacted either in the lower section or in the intermediate section of said absorption zone. In the upper section of the absorption zone, under the conditions in which the smallest volume of feed gas contacts the largest volume of absorption oil, the desirable hydrocarbon constituents having the least solubility in the absorption oil, in the present instance the butanes, are dissolved in the absorption oil. A portion of the absorption oil containing dissolved butanes is removed from the bottom of the upper section of the absorption zone by means of line 5, while the remainder of the absorption oil flows downwardly in the absorption zone under the conditions as described above, and is removed from the absorption zone by means of lines 6 and 7, as described. Treated gases free of the hydrocarbon constituents which it is desired to recover are removed from absorption zone 1 by means of line 4.

Although any means of removing and recovering the dissolved hydrocarbons from the absorption oil may be employed, such as a single still or several stills operated in parallel or series under identical or different temperature and pressure conditions, the preferred process is to introduce the segregated streams withdrawn from the absorber at various points in a stripping zone in a manner that the maximum stripping effect is secured on a minimum quantity of absorption oil containing the relatively more soluble dissolved hydrocarbon constituents as compared to the absorption oil streams containing the relatively less soluble hydrocarbon constituents. This is preferably secured by passing the absorption oil removed from absorption zone 1 by means of line 7, which contains primarily hexane hydrocarbon constituents, into the top of an upper section of a distillation zone 8, which for the purpose of description is shown to be a stripping tower. The absorption oil containing dissolved therein the pentane hydrocarbon constituents which is removed from the bottom of the intermediate section of absorption zone 1 by means of line 6, in accordance with the present invention, is introduced at the top of the intermediate section of the stripping zone while the absorption oil containing the butane hydrocarbon constituents, which is removed from the bottom of the top section of absorption zone 1 by means of line 5, is introduced at the top of the lower section of stripping zone 8. Under these conditions the stripping medium which is introduced by means of line 9 flows upwardly through stripping zone 8 and initially contacts a downflowing absorption oil containing only the butane hydrocarbon constituents. Conditions are adjusted to remove by means of line 3 an absorption oil substantially free of dissolved hydrocarbon constituents, which is preferably recycled to absorption zone 1. The stripping stream along with the butane hydrocarbon constituents removed from the absorption oil, flows from the lower section of stripping zone 8 into the intermediate section and countercurrently contacts the absorption oil, containing the pentane hydrocarbon constituents, which is introduced by means of line 6. Conditions are adjusted to substantially completely free the absorption oil flowing from the intermediate section into the lower section of pentane hydrocarbon constituents of intermediate solubility. The stripping fluid, along with hydrocarbons of least solubility and intermediate solubility in the absorption oil, flows upwardly from the intermediate section of the stripping zone into the top section of the stripping zone in which it countercurrently contacts the downflowing absorption oil containing the hexane hydrocarbon constituents, which is introduced into stripping zone 8 by means of line 7. Temperature and pressure conditions and other operating conditions are adjusted in a manner that the downflowing absorption oil entering the intermediate section of the stripping zone is substantially free of hexane hydrocarbon constituents having the most solubility in the absorption oil The stripped hydrocarbons, along with the stripping fluid, are removed overhead from stripping zone 8 by means of line 10, passed through cooler 11, and then introduced into separation zone 12 in which a separation is made between the stripping fluid and the recovered hydrocarbon constituents. The stripping fluid is removed by means of line 13 while the condensed hydrocarbon product is removed by means of line 14. By operating in the described manner in which the stripping fluid contacts only a relatively small amount of the absorption oil in the removal of the relatively more soluble constituents of said absorption oil, the removal of the dissolved constituents is accomplished with a minimum amount of stripping fluid in an efficient and economical manner.

Under certain conditions it may be desirable to recover the individual desired constituents in separate segregated fractions. The adaptation of the present process to this mode of operation is illustrated in Figure 2. For the purposes of illustration it is assumed as before that the feed gases comprise hydrocarbon constituents containing four to six carbon atoms in the molecule, and that these gases are produced by conventional refining operations. These gases are introduced in absorption zone 20 by means of line 21 and flow upwardly, contacting downflowing absorption oil which is introduced by means of line 22. The operating conditions are similar to those described with respect to the absorption zone of Figure 1. A segregated portion of the absorption oil containing the butanes and small fractions of propane and other less soluble constituents of the feed gases is withdrawn by means of line 24, a segregated portion of the absorption oil containing substantially all of the pentanes and small fractions of butanes and other less soluble constituents of the feed gases is withdrawn by means of line 25, while the remainder of the absorption oil containing the hexane constituents and small fraction of less soluble constituents, is withdrawn from the absorption zone by means of line 26. Treated feed gases substantially free of the butane, pentane and hexane constituents are withdrawn from absorption zone 20 by means of line 23. The absorption oil containing dissolved therein primarily the hexane hydrocarbon constituents, is introduced into the top of stripping zone 27, the fraction of the absorption oil containing primarily the pentane constituents is introduced into the top of stripping zone 28, while the absorption oil containing primarily the butane hydrocarbon constituents of least solubility in the absorption oil is introduced into the top of stripping zone 29. The absorption oil streams introduced in this manner flow downwardly through the respective zones 27, 28, and 29, and contact upflowing stripping fluid which is introduced by means of lines 48, 49 and 50. Operating conditions are adjusted to remove absorption oil streams, substantially free of dissolved hydrocarbon constituents, from the respective zones by means of lines 45, 46, and 47, which streams are combined by means of line 22 and recycled to absorption zone 20. Hydrocarbon constituents comprising essentially the butane constituents, are removed from zone 29 by means of line 32, cooled in cooler 35, and passed to separator 38, from which the hydrocarbon fraction is separated from the stripping fluid and removed by means of line 41. The stripping fluid is removed by means of line 44. Hydrocarbon constituents having an intermediate solubility and a relatively high solubility are removed from zones 28 and 27 by means of lines 31 and 30. These fractions are passed through coolers 34 and 33 and then introduced into separators 37 and 36, respectively. Pentane hydrocarbon constituents of intermediate solubility are removed by means of line 40, while hexane hydrocarbon constituents having the highest solubility are removed by means of line 39. The stripping fluid is removed from the respective zones by means of lines 43 and 42.

In an operation as disclosed in Figure 2, only the least soluble desired components, in this case the butanes, may be recovered substantially free of other desired constituents. Even the recovered butanes, which are recovered free of pentanes and hexanes because of prior removal of the latter from the feed gases, will contain quantities of undesirable less soluble gases such as propane. However, the respective constituents having various solubilities in the absorption fluid, may be readily separated in nearly pure form by an adaptation of the present process.

A preferred adaptation of the present invention is to employ a preliminary stripping operation utilizing a small quantity of stripping fluid which is just sufficient to strip nearly completely all absorbed components less soluble than the components contained primarily in the particular oil stream under consideration. For example, this adaptation of my invention as applied to the process illustrated in Figure 2 is shown in Figure 3. Feed gases similar to that described with respect to operations illustrated in Figures 1 and 2 are introduced into absorption zone 60 by means of line 61. These gases flow upwardly through absorption zone 60 and countercurrently contact downflowing absorption oil which is introduced into absorption zone 60 by means of line 62. Operating conditions are adjusted to remove overhead by means of line 81 a treated gas substantially free of desirable hydrocarbon constituents and to remove by means of lines 63, 64 and 65, segregated portions of the absorption oil containing primarily the least soluble constituents, the intermediate soluble hydrocarbon constituents, and the most soluble hydrocarbon constituents, respectively. The stream introduced into stripping zone 66 by means of line 65 contains hexane primarily and a small quantity of pentane and less soluble constituents. The amount of stripping fluid removed in line 70 is just sufficient to remove pentane and less soluble components nearly completely but to remove only a relatively small amount of the hexane. This stream is cooled in cooler 82 and passed to separation zone 83 in which a separation is made between the stripping fluid which is withdrawn by means of line 84 and the hydrocarbon constituents which are removed by means of line 85 and are recycled to absorption zone 60 in vapor form. The hexane constituents are removed from stripping zone 66 by means of line 72, cooled in cooler 86 and passed to separation zone 87 in which the stripping fluid is removed by means of line 88 while the hydrocarbon constituents are removed by means of line 89. In a similar manner hydrocarbon constituents boiling below the boiling range of pentane are removed from stripping zone 67 by means of line 77, cooled in cooler 90 and passed to separation zone 91. The stripping fluid is removed by means of line 92 while the hydrocarbon constituents are removed by means of line 93 and recycled to absorption zone 60. The desired pentane constituents are removed from stripping zone 67 by means of line 76, cooled in cooler 94 and passed to separation zone 95. The stripping fluid is removed by means of line 96 while the pentane constituents are removed by means of line 97. Constituents boiling below the boiling range of butanes are removed from stripping zone 68 by means of line 79, cooled in cooler 98 and passed to separation zone 99. The stripping fluid is removed by means of line 100 while the hydrocarbon constituents are recycled to absorption zone 60 by means of line 101. The desired butane constituents are removed from stripping zone 68 by means of line 102, cooled in cooler 103 and passed to separation zone 104. The stripping fluid is removed by means of line 105 while the desired butane constituents are removed by means of line 106. The absorption oil, substantially free of dissolved hydrocarbon constituents, is removed from stripping zones 66, 67 and 68 by means of lines 75, 74 and 80, respectively, and preferably recycled to absorption zone 60 by means of line 62. The stripping medium is introduced into zones 66, 67 and 68 by means of lines 69, 73, and 78, respectively.

The adaptation of preliminary stripping as applied to the operation described with respect to Figure 1 is illustrated in Figure 4. The operation is entirely similar to that described with respect to Figure 1 with the exception that the streams withdrawn by means of lines 5, 6 and 7 are introduced into preliminary stripping zones 110, 111 and 112 respectively. In these zones the streams withdrawn by means of lines 5, 6 and 7 are partially stripped by means of a stripping fluid which is introduced into the respective zones by means of lines 113, 114 and 115. The partially stripped streams are withdrawn from preliminary stripping zones 110, 111 and 112 and introduced into stripping zone 8 and therein treated in a manner described as respect to Figure 1. The amounts of stripping fluid used in zones 110, 111 and 112 are adjusted to be just sufficient to remove nearly completely all undesirable hydrocarbons of lesser solubility than the desired hydrocarbons butane, pentane and hexane. The stripping fluid used in zones 110, 111 and 112 may also be taken by partial withdrawal from zone 8, and introduced by means of lines 113, 114 and 115. In zone 112 the hydrocarbon constituents boiling below the boiling ranges of butanes, along with stripping fluid introduced by means of line 115 and also with small amounts of the butane, pentane and hexane hydrocarbons are withdrawn from stripping zone 112 by means of line 116, passed through cooler 117 and then introduced into separation zone 118. The hydrocarbon constituents are separated from the stripping fluid in zone 118 and returned to absorption zone 1 in vapor form by means of line 119 while the stripping fluid is removed by means of line 120. The hydrocarbon constituents boiling below the boiling ranges of butanes, along with the stripping fluid introduced by means of line 114 and also with small amounts of the butane and pentane hydrocarbons are withdrawn from stripping zone 111 by means of line 121, passed through cooler 122 and then introduced into separation zone 123. The hydrocarbon constituents are removed from separation zone 123 by means of line 124 and returned to absorption zone 1 as shown, while the stripping fluid is removed by means of line 125. The hydrocarbon constituents boiling below the range of butane along with the stripping fluid introduced into separation zone 110 by means of line 113 is withdrawn by means of line 126, passed through cooler 127 and then introduced into separation zone 128. Conditions are adjusted to remove by means of line 129 the hydrocarbon constituents which are returned to absorption zone 1, as shown, and to remove by means of line 130 the stripping fluid.

The process of the present invention may be widely varied. The invention is concerned with the removal of a plurality of constituents from a fluid feed mixture by means of an absorption fluid which essentially comprises contacting the feed mixture in an absorption zone under conditions in which the ratio of solvent to feed fluid is increased in the direction of flow of the feed gases by the withdrawal of segregated portions of the absorption fluid along the path of flow of the absorption fluid. It is readily apparent that the invention may be applied to the segregation of any number of constituents in the manner described. Thus the invention may be readily adapted to the recovery and segregation of hydrocarbon constituents containing from two to six carbon atoms in the molecule from mixtures containing the same. The process of the invention may be adapted to any operation in which it is desired to segregate various constituents present in a feed fluid using an absorbed fluid in a countercurrent treating system. For example the present invention may be readily adapted to the segregation and recovery of benzene, toluene and xylenes from coke oven gas and the like. The process, however, is particularly adapted for the segregation of desirable hydrocarbon constituents from feed gas mixtures containing the same, such as in the recovery of various hydrocarbon constituents from petroleum oil gases produced in various refining operations.

Temperature and pressure conditions may vary widely and will depend upon the particular feed gas mixture being treated, the character of the absorption fluid and of the stripping fluid, and upon the extent and degree to which recovery of particular constituents is desired. The points at which the segregated absorption oil streams are withdrawn in the absorption zone, and the quantities of the absorption oil withdrawn at the respective points, will likewise vary and be a function of the character of the feed gases. In general, the point at which the initial segregated portion of the absorption oil is withdrawn from the absorption zone containing the least soluble constituents will be the point at which the feed gases contain no appreciable amounts of more soluble constituents. In a similar manner, the points at which additional segregated streams containing the relatively less soluble constituents are withdrawn from the absorption zone are the points at which the upflowing gases contain no appreciable concentration of more soluble constituents.

The points at which the respective segregated rich absorption oil streams are introduced into the stripping zone are similarly determined. Thus a segregated portion of the absorption oil containing relatively less soluble dissolved hydrocarbon constituents should be introduced into the stripping zone at a point at which the downflowing absorption oil contains no appreciable concentration of constituents which are relatively more soluble in the absorption oil. The stripping zones are conducted under any suitable temperature and pressure conditions which will be a function of the type of absorption fluid employed, the type of stripping medium employed and the character of the dissolved constituents. Any suitable stripping medium may be employed. However, in general the preferred stripping medium is steam, particularly in operations in which valuable hydrocarbon constituents are recovered from feed gas mixtures containing the same.

The process of the present invention is not to be limited by any theory or mode of operation but only by the following claims in which it is desired to claim all novelty insofar as the prior art permits.

I claim:

1. A continuous process for the removal of a plurality of constituents from a fluid feed mixture containing the same by means of an absorption fluid in which the respective constituents are soluble in a varying degree which comprises contacting the feed mixture in an absorption zone with a countercurrently flowing absorption fluid under conditions to absorb the respective constituents and under conditions in which the ratio of absorption fluid to the feed mixture is by steps progressively increased in the direction of and throughout the course of flow of the feed mixture while the same is in contact with the absorption fluid by withdrawing segregated portions of the absorption fluid at a plurality of points along the path of flow of the absorption fluid, substantially completely stripping all of the absorbed material from the absorption fluid withdrawn from contact with said feed mixture, and returning such stripped absorption fluid to the absorption zone.

2. Process in accordance with claim 1 in which said fluid feed mixture is produced by a petroleum oil refining operation and comprises hydrocarbon constituents containing from one to six carbon atoms in the molecule, and in which said absorption fluid comprises a relatively high boiling petroleum oil fraction.

3. Process in accordance with claim 1 in which said fluid feed mixture is produced by a petroleum oil refining operation and comprises hydrocarbon constituents containing from one to six carbon atoms in the molecule, in which said absorption fluid comprises a relatively high boiling petroleum oil fraction, and in which the constituents recovered comprise hydrocarbons containing from four to six carbon atoms in the molecule.

4. Process in accordance with claim 1 in which conditions are adjusted so that the segregated portion of the absorption fluid withdrawn at a point nearest the point at which the absorption oil is introduced into the absorption zone is substantially saturated with the least soluble desirable constituents, and is substantially free of the more soluble constituents.

5. Process in accordance with claim 1 in which said segregated portions of the absorption fluid are passed to respective distillation zones and treated in a manner to remove and recover the absorbed constituents.

6. Process according to claim 1 in which the points of withdrawal of the respective streams are so chosen that each stream saturated with a relatively less soluble constituent is withdrawn from the system at a point at which the stream of feed mixture does not contain an appreciable quantity of more soluble constituents.

7. A continuous process for the removal of hydrocarbon constituents from a gaseous feed mixture produced in a petroleum oil refining operation which comprises contacting the feed mixture in an absorption zone with a countercurrently flowing absorption oil under conditions to absorb the hydrocarbon constituents containing from four to six and more carbon atoms in the molecule and under conditions in which the ratio of absorption oil to the feed gas mixture is by steps progressively increased in the direction and throughout the course of flow of feed gas mixture while in contact with said absorption fluid by the withdrawal of segregated portions of the absorption oil at a plurality of points along the path of flow of the absorption oil, substantially completely stripping all of the absorbed hydrocarbon constituents from the absorption oil withdrawn from contact with said feed mixture, and returning such stripped absorption oil to the absorption zone.

8. Process in accordance with claim 7 in which said absorption oil is withdrawn from the absorption zone at three points.

9. Process for the removal and recovery of a plurality of constituents from a feed mixture containing the same by means of an absorption fluid in which the respective constituents are soluble in a varying degree which comprises contacting the feed mixture in an absorption zone with a countercurrently flowing absorption fluid under conditions to absorb the respective constituents, withdrawing from the absorption zone at intervals along the path of the flow of the absorption fluid segregated portions of said absorption fluid, withdrawing the remainder of the absorption fluid from the bottom of the absorption zone, and passing the same into the top section of a stripping zone, introducing the preceding stream of absorption fluid withdrawn from the absorption zone at a point in said distillation zone below the point at which the absorption stream withdrawn from the bottom of said absorption zone is introduced, and introducing the next successive streams into said distillation zone in a similar manner, maintaining conditions in said distillation zone adapted to remove overhead and recover the absorbed constituents and to remove as a bottoms the absorption fluid substantially free of absorbed constituents.

10. A continuous process for the removal of hydrocarbon constituents from a gaseous feed mixture produced in a petroleum refining operation which comprises passing the said mixture into the bottom of an absorption tower, passing absorption oil into the top of said tower and downward in said tower to make contact with the upward flowing gaseous mixture under conditions to absorb the hydrocarbon constituents containing from four to six and more carbon atoms in the molecule and under conditions in which the ratio of absorption fluid to the feed gas mixture is by steps progressively increased in the direction of the flow of the feed gas mixture and throughout the length of the absorption tower by withdrawal of segregated portions of the absorption oil at a plurality of points along the tower, substantially completely stripping all of the absorbed constituents from the absorption oil withdrawn from the tower, and returning such stripped absorption oil to the top of said absorption tower.

11. Process according to claim 9 in which the said feed mixture is produced by a petroleum oil refining operation and comprises hydrocarbon constituents containing from one to six carbon atoms in the molecule, and in which the said absorption fluid comprises a relatively high boiling petroleum oil fraction.

12. Process according to claim 9 in which the said feed mixture is produced by a petroleum oil refining operation and comprises hydrocarbon constituents containing from one to six carbon atoms in the molecule, in which the said absorption fluid comprises a relatively high boiling petroleum fraction, and in which the constituents recovered comprise hydrocarbons containing from four to six carbon atoms in the molecule.

13. Process according to claim 9 in which the said feed mixture is produced by a petroleum oil refining operation and comprises hydrocarbon constituents containing from one to six carbon atoms in the molecule, in which said absorption fluid comprises a relatively high boiling petroleum oil fraction, in which the constituents recovered comprise hydrocarbons containing from four to six carbon atoms in the molecule, and in which the said absorption oil is withdrawn from the absorption zone at three points.

14. Process according to claim 9 in which each portion of absorption fluid withdrawn from the absorption zone is passed through a separate preliminary stripping zone prior to introduction into the main stripping zone into which all of the segregated portions of the absorption fluid are finally passed, the amount of stripping fluid used in said preliminary stripping zones being just sufficient in each case to remove nearly completely all materials of lesser solubility with respect to the absorption fluid than the desired products, and in which such materials of low solubility are separated from the stripping fluid and returned to the absorption zone.

15. Process according to claim 9 in which the feed mixture is produced by a petroleum oil refining operation and comprises hydrocarbon constituents containing chiefly four to six carbon atoms in the molecule, in which the said absorption fluid comprises a relatively high boiling petroleum oil fraction, in which each portion of absorption fluid removed from the absorption zone is passed through a separate preliminary stripping zone prior to introduction into the main stripping zone into which all of the segregated portions of absorption fluid are finally passed, in which the amount of stripping fluid used in the preliminary stripping zones is in each case just sufficient to remove nearly completely all hydrocarbons of lesser solubility with respect to the absorption fluid than the desired hydrocarbons butane, pentane, and hexane, and in which such hydrocarbons of lesser solubility are separated from the stripping fluid and returned to the absorption zone.

16. Process for the removal and recovery of a plurality of constituents from a feed mixture containing the same by means of an absorption fluid in which the respective constituents are soluble in a varying degree which comprises contacting the feed mixture in an absorption zone with a countercurrently flowing absorption fluid under conditions to absorb the respective constituents, withdrawing from the absorption zone at intervals along the path of the flow of the absorption fluid segregated portions of said absorption fluid, withdrawing the remainder of the absorption fluid from the absorption zone and passing the same into the section of a stripping zone most distant from the point at which the stripping fluid used in such stripping zone is introduced, introducing the preceding stream of absorption fluid withdrawn from the absorption zone at a point in said stripping zone nearer to the point of introduction of the stripping fluid than the point at which the aforementioned portion of the absorption fluid was introduced, and introducing the next successive streams of absorption oil into the said stripping zone in a similar manner, and maintaining conditions in said stripping zone adapted to remove and recover the absorbed constituents and to remove the absorption fluid substantially free of absorbed constituents.

17. Process for the removal and separate recovery of butanes, pentanes and hexanes from a gaseous feed mixture containing essentially only such hydrocarbons by means of a relatively high boiling petroleum oil fraction as an absorption oil in which the respective constituents of the said mixture are soluble in a varying degree which comprises passing the said feed mixture into the bottom of the absorption tower, passing the said absorption oil into the top of said tower and downward in said tower to make contact with the upward flowing gaseous mixture under conditions to absorb the hydrocarbon constituents containing from four to six carbon atoms in the molecule, withdrawing segregated portions of the absorption oil at three points along the tower, such points of withdrawal being determined in such a way that each stream saturated with a relatively less soluble constituent is withdrawn from the tower at a point at which the upflowing gases do not contain an appreciable quantity of more soluble constituents, passing the absorption oil withdrawn from the highest point of withdrawal to the top of a stripping tower while passing stripping fluid into the bottom thereof, removing from a point near the top of said stripping tower an amount of the stripping fluid just sufficient to remove any constituents boiling below the boiling range of the butanes, separating such constituents from the stripping fluid and returning them to the absorption tower, removing the remainder of the stripping fluid at a lower point in the said stripping tower together with the remainder of the products removed from the absorption oil, consisting essentially of pure butanes, passing the portion of the absorption oil removed from the second highest point of withdrawal from the absorption tower to the top of a second stripping tower while a stripping fluid is introduced into the bottom thereof, removing from a point near the top of said second stripping tower a portion of the stripping fluid just sufficient to remove butanes and less soluble constituents, separating the stripping fluid so removed from the hydrocarbon constituents, returning the latter to the absorption zone, removing the remainder of the said stripping fluid from the said second stripping tower at a lower point in said tower to recover the remainder of the hydrocarbon constituents stripped out in said tower, consisting chiefly of pure pentanes, passing the bottoms from the absorption tower to the top of a third stripping tower, while stripping fluid is introduced into the bottom thereof, removing from a point near the top of said third stripping tower a portion of the said stripping fluid just sufficient to remove pentanes and less soluble constituents from the absorption oil, separating the stripping fluid so removed from the hydrocarbons present, returning the latter to the absorption zone, removing the remainder of the stripping fluid from a lower point in said third stripping tower to recover the remaining hydrocarbons stripped out in said third stripping tower, consisting chiefly of pure hexanes, and returning all of the substantially completely stripped absorption oil from the three stripping towers to the top of the absorption tower.

FREDERIC A. L. HOLLOWAY.